United States Patent
Wakatsuki et al.

(10) Patent No.: US 8,651,216 B2
(45) Date of Patent: *Feb. 18, 2014

(54) MOTOR MOUNT STRUCTURE FOR ELECTRIC VEHICLE

(75) Inventors: Sunao Wakatsuki, Hamamatsu (JP); Shuichi Yamane, Hamamatsu (JP)

(73) Assignee: Suzuki Motor Corporation (JP)

( * ) Notice: Subject to any disclaimer, the term of this patent is extended or adjusted under 35 U.S.C. 154(b) by 254 days.

This patent is subject to a terminal disclaimer.

(21) Appl. No.: 13/305,955

(22) Filed: Nov. 29, 2011

(65) Prior Publication Data

US 2012/0160590 A1   Jun. 28, 2012

(30) Foreign Application Priority Data

Dec. 28, 2010 (JP) ................................. 2010-292770

(51) Int. Cl.
*B60K 1/00* (2006.01)
(52) U.S. Cl.
USPC .......................................... 180/291; 180/299
(58) Field of Classification Search
USPC .................... 180/65.1, 65.21, 291
See application file for complete search history.

(56) References Cited

U.S. PATENT DOCUMENTS

| | | | |
|---|---|---|---|
| 4,263,980 A * | 4/1981 | Harlow et al. | 180/292 |
| 5,065,831 A | 11/1991 | Murakami | |
| 5,740,876 A * | 4/1998 | Shimose et al. | 180/232 |
| 6,550,561 B2 * | 4/2003 | Dau et al. | 180/299 |
| 6,708,793 B2 * | 3/2004 | Witherspoon et al. | 180/291 |
| 6,994,178 B2 | 2/2006 | Mizuno | |
| 7,144,039 B2 * | 12/2006 | Kawasaki et al. | 280/784 |
| 7,380,830 B2 * | 6/2008 | Mitsui et al. | 280/784 |
| 7,413,050 B2 * | 8/2008 | Miyagawa et al. | 180/291 |
| 7,530,420 B2 * | 5/2009 | Davis et al. | 180/233 |
| 7,562,727 B1 | 7/2009 | Hoffart | |
| 7,562,737 B2 * | 7/2009 | Miyahara et al. | 180/291 |
| 7,575,087 B2 * | 8/2009 | Kim | 180/299 |
| 7,708,103 B2 * | 5/2010 | Okuyama et al. | 180/299 |
| 8,479,868 B2 * | 7/2013 | Wakatsuki et al. | 180/299 |
| 2002/0033594 A1 * | 3/2002 | Yamamoto et al. | 280/781 |
| 2002/0189873 A1 * | 12/2002 | Mizuno | 180/65.3 |
| 2005/0155806 A1 * | 7/2005 | Kanehira et al. | 180/291 |
| 2010/0025131 A1 * | 2/2010 | Gloceri et al. | 180/65.28 |

FOREIGN PATENT DOCUMENTS

JP 2008-081009 4/2008

* cited by examiner

*Primary Examiner* — J. Allen Shriver, II
*Assistant Examiner* — Bridget Avery
(74) *Attorney, Agent, or Firm* — Myers Bigel Sibley & Sajovec, P.A.

(57) ABSTRACT

In a motor mount structure of an electric vehicle, in which a front cross frame is connected to a front cross member, a rear cross frame is secured to a rear cross member, opposite sides of a power train in a vehicle width direction are supported on side frames by a side mount device placed so that positions in a vehicle fore-and-aft direction and a vehicle vertical direction are close to a horizontal line passing through the center of gravity of the power train and extending in the vehicle width direction, while a front mount device that regulates rolling of the power train is placed on a front portion of the power train, and the front mount device is mounted to a central portion of the front cross frame in the vehicle width direction.

7 Claims, 2 Drawing Sheets

MOTOR MOUNT STRUCTURE FOR ELECTRIC VEHICLE

CROSS-RELATED APPLICATIONS

This application claims priority from Japanese Patent Application No. 2010-292770; filed Dec. 28, 2010, the disclosure of which is incorporated herein by reference in its entirety.

FIELD OF THE INVENTION

The present invention relates to a motor mount structure for an electric vehicle, and more particularly, relates to a motor mount structure for an electric vehicle in which a power train of the electric vehicle can be mounted below a rear floor in a compact manner.

BACKGROUND OF THE INVENTION

Electric vehicles that travel using electric power from a fuel cell or the like include a power train including a motor and a transmission. In an example of such a motor mount structure of an electric vehicle, a power train is supported via a mount device on a sub-frame placed below a rear floor (JP 2008-81009 A)

In the motor mount structure of an electric vehicle described in JP 2008-81009 A, a front end and a rear end of the power train are supported at a front portion and a rear portion, respectively, of the sub-frame by mount devices.

In the motor mount structure of an electric vehicle described in JP 2008-81009 A, the power train is supported via the mount devices on the sub-frame placed below the rear floor. However, the front end and the rear end of the power train are supported at the front portion and the rear portion of the sub-frame by the mount devices, which increases a fore-and-aft length of the sub-frame, reduces rigidity of the sub-frame, and increases vibration transmitted from the power train.

Also in the motor mount structure of an electric vehicle described in JP 2008-81009 A, the mount device that supports the rear end of the power train is mounted to the rear portion of the sub-frame. Thus, the mount device reduces space rearward of the sub-frame, thereby making it difficult to ensure space for housing an on-vehicle component such as a spare tire below the rear floor.

SUMMARY OF THE INVENTION

The present invention has as an object to reduce vibration transmitted from a power train including a motor to a sub-frame, and to ensure space for housing an on-vehicle component rearward of a sub-frame.

The present invention provides a motor mount structure of an electric vehicle in which a sub-frame is placed, the sub-frame including a pair of a left side frame and a right side frame extending in a vehicle fore-and-aft direction below a front floor and a rear floor connected to the front floor via a vertical wall portion, and a pair of a front cross frame and a rear cross frame connecting between the side frames, and a power train in which a transmission including a differential device is connected to a side of a motor in a vehicle width direction is supported on the sub-frame by a mount device, wherein the front cross frame is connected to a front cross member provided in a connecting portion between the front floor and the vertical wall portion, the rear cross frame is secured to a rear cross member along a lower surface of the rear floor and extending in the vehicle width direction above the differential device, opposite sides of the power train in the vehicle width direction are supported on the side frames by a side mount device placed so that positions in the vehicle fore-and-aft direction and a vehicle vertical direction are close to a horizontal line passing through the center of gravity of the power train and extending in the vehicle width direction, while a front mount device that regulates rolling of the power train is placed on a front portion of the power train, and the front mount device is mounted to a central portion of the front cross frame in the vehicle width direction.

In the motor mount structure of an electric vehicle of the present invention, the front cross frame is connected to the front cross member provided in the connecting portion between the front floor and the vertical wall portion, and the rear cross frame is secured to the rear cross member along the lower surface of the rear floor and extending in the vehicle width direction above the differential device. This can reduce a fore-and-aft length of the sub-frame, increase rigidity of the sub-frame, and increase space rearward of the rear cross frame.

Also, the left and right side mount devices support the power train to rock the power train around the horizontal line passing through the center of gravity and extending in the vehicle width direction, and the front mount device regulates rolling around the horizontal line passing through the center of gravity of the power train, thereby reducing vibration transmitted from each mount device to the sub-frame in rolling of the power train.

The mount device is not placed on the rear cross frame, thereby ensuring space for housing an on-vehicle component rearward of the rear cross frame.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
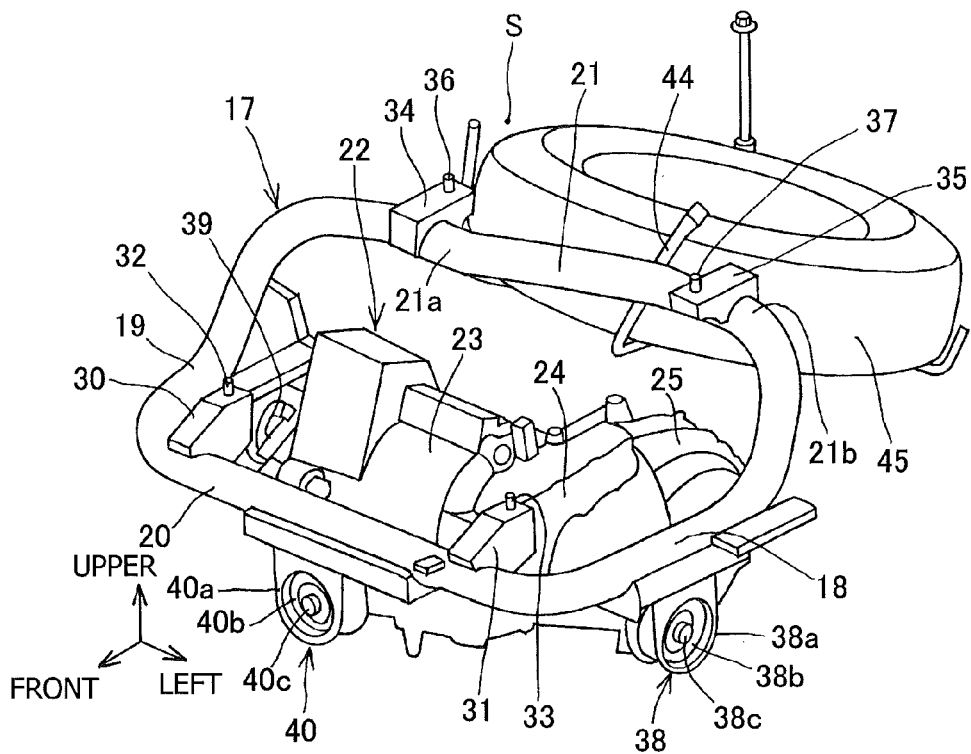
FIG. 1 is a perspective view of a motor mount structure of an electric vehicle.
Figure 2:
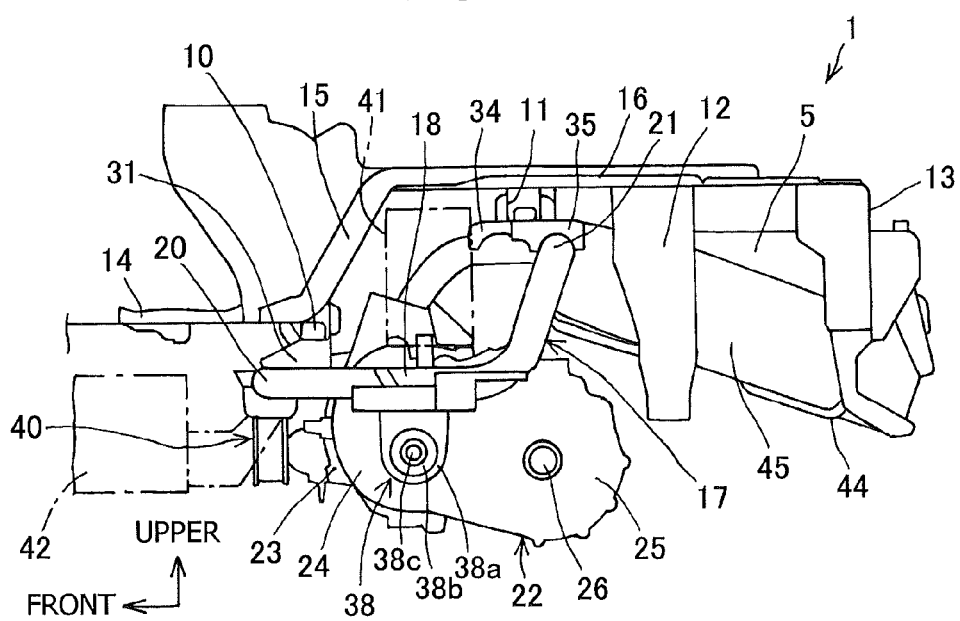
FIG. 2 is a left side view of an electric vehicle having the motor mount structure.
Figure 3:
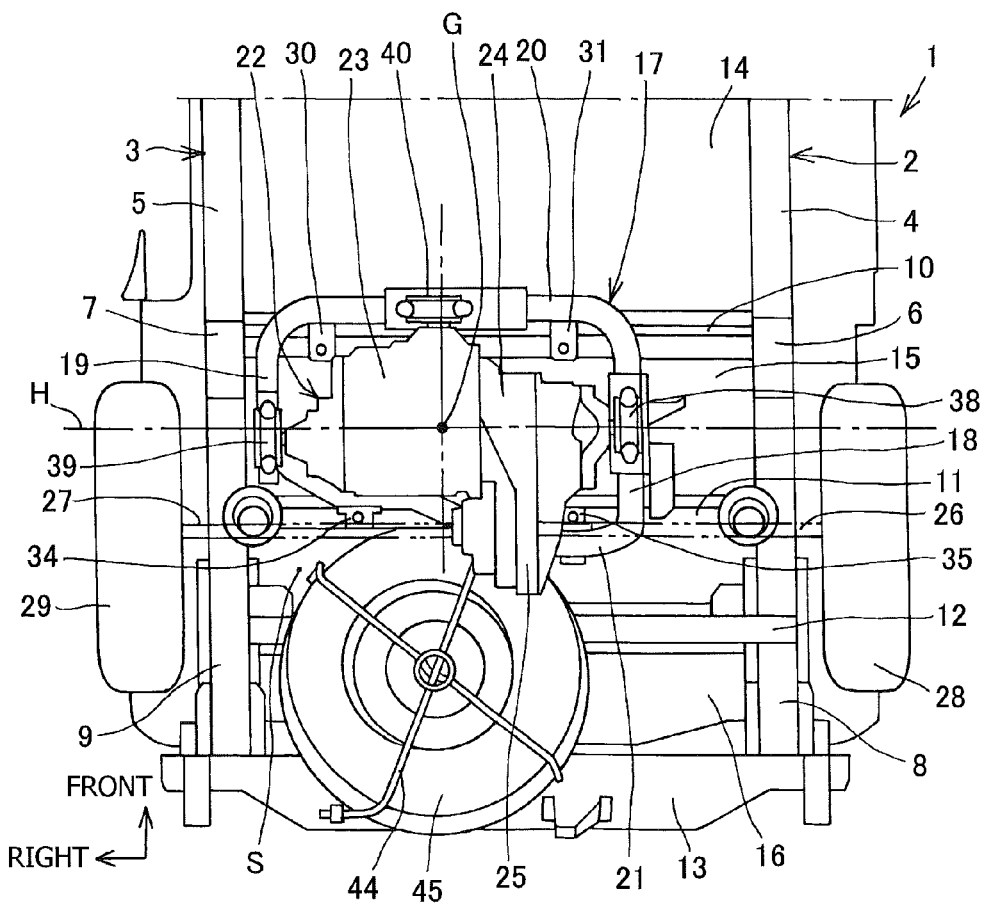
FIG. 3 is a bottom view of the electric vehicle having the motor mount structure.
Figure 4:
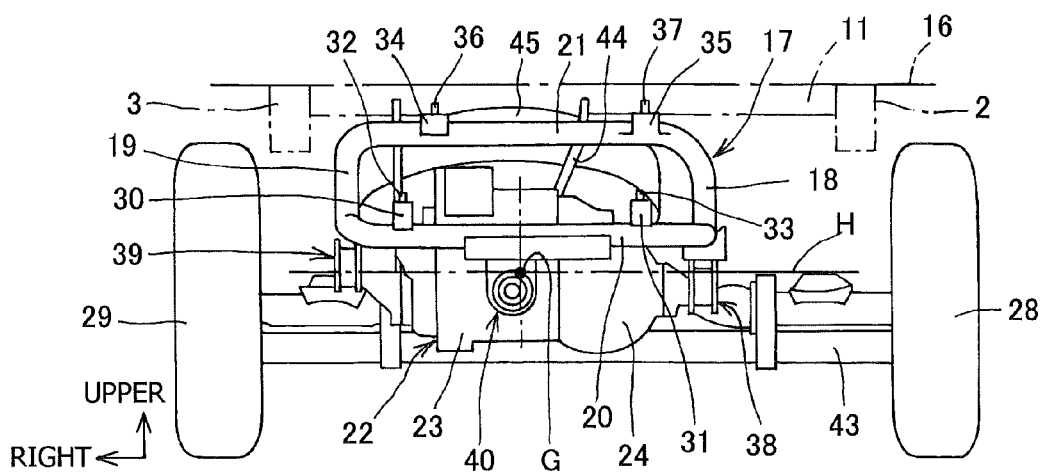
FIG. 4 is a front view of the electric vehicle having the motor mount structure.

FIGS. 1 to 4 show the embodiment of the present invention. In FIGS. 2 to 4, reference numeral 1 denotes an electric vehicle; reference numeral 2 a left side member, and reference numeral 3 a right side member. The electric vehicle 1 includes a pair of a left side member 2 and a right side member 3 extending in a vehicle fore-and-aft direction. As shown in FIG. 3, the left side member 2 and the right side member 3 are formed on a left front portion 4 and a right front portion 5 extending substantially horizontally on a front side in a vehicle fore-and-aft direction, a left rising portion 6 and a right rising portion 7 rising rearward and upward from rear ends of the left front portion 4 and the right front portion 5, and a left rear portion 8 and a right rear portion 9 extending rearward substantially horizontally from rear ends of the left rising portion 6 and the right rising portion 7.

The left side member 2 and the right side member 3 connect a connecting portion between the left front portion 4 and the left rising portion 6 and a connecting portion between the right front portion 5 and the right rising portion 7 using a front cross member 10 extending in a vehicle width direction, front portions of the left rear portion 8 and the right rear portion 9 are connected by a rear cross member 11 extending in the vehicle width direction, and intermediate portions of the left rear portion 8 and the right rear portion 9 are connected by a suspension cross member 12 extending in the vehicle width direction, and further rear ends of the left rear portion 8 and the right rear portion 9 are connected by a rear panel 13 extending in the vehicle width direction.

A front floor 14 is provided on upper portions of the left front portion 4 and the right front portion 5 of the left side member 2 and the right side member 3. A vertical wall portion 15 connected to the front floor 14 is provided on upper portions of the left rising portion 6 and the right rising portion 7. A rear floor 16 connected to the vertical wall portion 15 is provided on upper portions of the left rear portion 8 and the right rear portion 9.

Thus, the rear floor 16 is connected to the front floor 14 via the vertical wall portion 15.

A sub-frame 17 is placed below the front floor 14 and the rear floor 16 connected to the front floor 14 via the vertical wall portion 15. As shown in FIG. 1, the sub-frame 17 includes a pair of a left side frame 18 and a right side frame 19 extending in the vehicle fore-and-aft direction, and a pair of a front cross frame 20 and a rear cross frame 21 connecting the side frames 18 and 19, and is formed of a pipe material into an annular shape.

In the sub-frame 17, front ends of the left side frame 18 and the right side frame 19 are connected to opposite ends of the front cross frame 20 horizontally extending in the vehicle width direction. The right side frame 19 is formed to be shorter than the left side frame 18, and the left side frame 18 and the right side frame 19 are formed so as to have a horizontal front portion and a rear portion rising obliquely rearward and upward from a midpoint and extending upward, and extended rear ends are located at the same height. To rear ends extending upward of the left side frame 18 and the right side frame 19, opposite ends of the rear cross frame 21 horizontally extending in the vehicle width direction are connected.

On the sub-frame 17, a power train 22 is supported by mount devices 38 to 40 described later. The power train 22 includes a motor 23 with a rotation axis being oriented in the vehicle width direction, and a transmission 24 connected to a left side portion of the motor 23 in the vehicle width direction. The transmission 24 includes a differential device 25 on a rear side. The differential device 25 is placed on a rear side of the transmission 24 and below the rear cross member 11 along a lower surface of the rear floor 16, and connects inner ends of a left axle 26 and a right axle 27. A left wheel 28 and a right wheel 29 are mounted to outer ends of the left axle 26 and the right axle 27, respectively.

As shown in FIG. 1, on the sub-frame 17, a front right mounting bracket 30 is provided on a side of the motor 23 in the vehicle width direction of the front cross frame 20, and a front left mounting bracket 31 is provided on a side of the differential device 25 in the vehicle width direction. The front right mounting bracket 30 and the front left mounting bracket 31 have a front right mounting bolt 32 and a front left mounting bolt 33, respectively. Also, a rear right mounting bracket 34 is provided on the side of the motor 23 in the vehicle width direction of the rear cross frame 21, and a rear left mounting bracket 35 is provided on the side of the differential device 25 in the vehicle width direction. The rear right mounting bracket 34 and the rear left mounting bracket 35 have a rear right mounting bolt 36 and a rear left mounting bolt 37, respectively.

In the sub-frame 17, the front cross frame 20 is connected to the front cross member 10 provided in the connecting portion between the front floor 14 and the vertical wall portion 15 by the front right mounting bolt 32 of the front right mounting bracket 30 and the front left mounting bolt 33 of the front left mounting bracket 31. Also, in the sub-frame 17, the rear cross frame 21 is secured to the rear cross member 11 along the lower surface of the rear floor 16 and extending in the vehicle width direction above the differential device 25 by the rear right mounting bolt 36 of the rear right mounting bracket 34 and the rear left mounting bolt 37 of the rear left mounting bracket 35.

In the sub-frame 17, as shown in FIGS. 3 and 4, a left side mount device 38 is provided on the left side frame 18, and a right side mount device 39 is provided on the right side frame 19. As shown in FIGS. 1 and 2, the left side mount device 38 has a structure in which a shaft 38c is supported in an outer cylinder 38a via a rubber isolator 38b, and the outer cylinder 38a is mounted to the left side frame 18 with the center of the shaft 38c being oriented in the vehicle width direction. Similarly, the right side mount device 39 has a structure in which a shaft is supported in an outer cylinder via a rubber isolator, and the outer cylinder is mounted to the right side frame 19 with the center of the shaft being oriented in the vehicle width direction. The left side mount device 38 and the right side mount device 39 are placed on the left side frame 18 and the right side frame 19, respectively, so that positions in the vehicle fore-and-aft direction and the vehicle vertical direction are close to a horizontal line H passing through the center of gravity G of the power train 22 and extending in the vehicle width direction.

In the power train 22, a left end of the transmission 24 in the vehicle width direction is connected to the shaft portion 38c of the left side mount device 38, and a right end of the motor 23 in the vehicle width direction is connected to the shaft portion of the right side mount device 39. Thus, in the power train 22, opposite ends in the vehicle width direction are supported on the left side frame 18 and the right side frame 19 of the sub-frame 17 by the left side mount device 38 and the right side mount device 39 placed so that the positions in the vehicle fore-and-aft direction and the vehicle vertical direction are close to the horizontal line H passing through the center of gravity G of the power train 22 and extending in the vehicle width direction.

Meanwhile, a front mount device 40 that regulates rolling of the power train 22 is placed on a front portion of the power train 22. As shown in FIG. 1, the front mount device 40 has a structure in which a shaft 40c is supported in an outer cylinder 40a via a rubber isolator 40b, and the outer cylinder 40a is mounted to a central portion of the front cross frame 20 in the vehicle width direction with the center of the shaft 40c being oriented in the vehicle fore-and-aft direction. The power train 22 connects a front end of the motor 23 to the shaft portion 40c of the front mount device 40.

An auxiliary battery 41 is placed above the transmission 24 of the power unit 22 supported on the sub-frame 17 by the mount devices 38 to 40. A battery unit 42 for the motor 23 is placed on a front side of the front cross frame 20 of the sub-frame 17. In FIG. 4, reference numeral 43 denotes an axle beam that connects the left wheel 28 and the right wheel 29.

As such, in the motor mount structure of the electric vehicle 1, the front cross frame 20 is connected to the front cross member 10 provided in the connecting portion between the front floor 14 and the vertical wall portion 15, and the rear cross frame 21 is secured to the rear cross member 11 along the lower surface of the rear floor 16 and extending in the vehicle width direction above the differential device 25. This can reduce the length of the sub-frame 17 in the fore-and-aft direction, increase rigidity of the sub-frame 17, and increase space S rearward of the rear cross frame 21.

The left side mount device 38 and the right side mount device 39 support the power train 22 to rock the power train 22 around the horizontal line H passing through the center of gravity G and extending in the vehicle width direction, and the front mount device 40 regulates rolling around the horizontal line H passing through the center of gravity G of the power train 22. This can reduce vibration transmitted from the mount devices 38 to 40 to the sub-frame 17 in rolling of the power train 22.

Since the mount device is not placed on the rear cross frame 21, the mount device does not reduce space rearward of the sub-frame 17, thereby ensuring the space S for housing an on-vehicle component rearward of the rear cross frame 21.

In the motor mount structure of the electric vehicle 1, the sub-frame 17 including the pair of the left side frame 18 and the right side frame 19 extending in the vehicle fore-and-aft direction, and the pair of the front cross frame 20 and the rear cross frame 21 connecting the side frames 18 and 19 is formed of the pipe material into the annular shape.

Thus, the motor mount structure of the electric vehicle 1 can increase rigidity of the sub-frame 17, and reduce vibration transmitted from the front cross member 10 and the rear cross member 11 to a vehicle body.

In the motor mount structure of the electric vehicle 1, as shown in FIG. 1, the rear cross frame 21 of the sub-frame 17 is curved at the intermediate portion so that the portion 21a placed on the side of the motor 23 in the vehicle width direction is located forward in the vehicle with respect to the portion 21b placed on the side of the differential device 25.

Thus, in the motor mount structure of the electric vehicle 1, the rear cross frame 21 is curved at the intermediate portion, thereby reducing a peripheral length of the sub-frame 17 and preventing vibration of the sub-frame 17.

Also, as shown in FIG. 1, in the motor mount structure of the electric vehicle 1, the rear cross frame 21 of the sub-frame 17 is secured to the rear cross member 11 by the rear right mounting bracket 34 placed on the side of the motor 23 in the vehicle width direction and the rear left mounting bracket 35 placed on the side of the differential device 25. In the sub-frame 17, the rear right mounting bracket 34 placed on the side of the motor 23 protrudes from the rear cross frame 21 rearward in the vehicle, while the rear left mounting bracket 35 placed on the side of the differential device 25 protrudes forward of the vehicle.

Thus, in the motor mount structure of the electric vehicle 1, protruding directions of the two mounting brackets 34 and 35 with respect to the rear cross frame 21 can be changed to prevent deformation of the mounting brackets 34 and 35, and reduce vibration transmitted from the sub-frame 17 to the vehicle body.

Furthermore, in the motor mount structure of the electric vehicle 1, as shown in FIGS. 1 and 3, a tire support member 44 is provided in space S on the rear side of the rear cross frame 21, and a spare tire 45 is placed to be tilted downward on the rear side.

In the motor mount structure of the electric vehicle 1, the spare tire 45 as an on-vehicle component can be placed in the space S formed on the rear side of the sub-frame 17, thereby increasing mountability of the on-vehicle component in the vehicle.

In the motor mount structure of the electric vehicle 1, the portion 21a of the rear cross frame 21 placed on the side of the motor 23 is curved forward in the vehicle along an outer peripheral shape of the spare tire 45.

Thus, in the motor mount structure of the electric vehicle 1, a spare tire 45 having a larger outer diameter can be mounted on the rear side of the rear cross frame 21.

The present invention can reduce vibration transmitted from the power train including the motor to the sub-frame, and ensure the space for housing the on-vehicle component rearward of the sub-frame, and can be applied to vehicles including a motor power unit such as commercial vehicles or passenger vehicles.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A motor mount structure for an electric vehicle in which a sub-frame is placed, the sub-frame comprising a pair of a left side frame and a right side frame extending in a vehicle fore-and-aft direction below a front floor and a rear floor connected to the front floor via a vertical wall portion, and a pair of a front cross frame and a rear cross frame connecting between the side frames, and a power train in which a transmission comprising a differential device is connected to a side of a motor in a vehicle width direction is supported on the sub-frame by a mount device, wherein the front cross frame is connected to a front cross member provided in a connecting portion between the front floor and the vertical wall portion, wherein the rear cross frame is secured to a rear cross member along a lower surface of the rear floor and extending in the vehicle width direction above the differential device, wherein opposite sides of the power train in the vehicle width direction are supported on the side frames by a side mount device placed so that positions in the vehicle fore-and-aft direction and a vehicle vertical direction are close to a horizontal line passing through the center of gravity of the power train and extending in the vehicle width direction, wherein a front mount device that regulates rolling of the power train is placed on a front portion of the power train, and wherein the front mount device is mounted to a central portion of the front cross frame in the vehicle width direction.

2. The motor mount structure for an electric vehicle according to claim 1, wherein the sub-frame is formed of a pipe material into an annular shape.

3. The motor mount structure for an electric vehicle according to claim 1, wherein the rear cross frame is curved at an intermediate portion so that a portion placed on a side of the motor in the vehicle width direction is located on a front side of the vehicle with respect to a portion placed on a side of the differential device.

4. The motor mount structure for an electric vehicle according to claim 1, wherein the rear cross frame is secured to the rear cross member by a mounting bracket placed on the side of the motor in the vehicle width direction and a mounting bracket placed on the side of the differential device,
   the mounting bracket placed on the side of the motor protrudes from the rear cross frame rearward of the vehicle, while the mounting bracket placed on the side of the differential device protrudes forward of the vehicle.

5. The motor mount structure for an electric vehicle according to claim 1, wherein a spare tire is placed in a space rearward of the rear cross frame.

6. The motor mount structure for an electric vehicle according to claim 2, wherein the rear cross frame is curved at an intermediate portion so that a portion placed on a side of the motor in the vehicle width direction is located on a front side of the vehicle with respect to a portion placed on a side of the differential device.

7. The motor mount structure for an electric vehicle according to claim 5, wherein the rear cross frame is curved forward in the vehicle along an outer peripheral shape of the spare tire.

* * * * *